Sept. 21, 1965    K. R. SWANSON    3,206,886
ANIMAL TRAP
Filed June 1, 1964

INVENTOR.
KENNETH R. SWANSON
BY
William F. Woode
ATTORNEY

United States Patent Office 3,206,886
Patented Sept. 21, 1965

3,206,886
ANIMAL TRAP
Kenneth R. Swanson, Waverly, Minn.
Filed June 1, 1964, Ser. No. 371,303
1 Claim. (Cl. 43—90)

This invention relates to a new and improved animal trap; more particularly, it concerns an animal trap characterized by a pair of cooperating jaws having a unique shape designed to form a body enveloping enclosure when the jaws are in a closed animal clamping position. Novel means for holding the jaws in an open set position and releasing them under spring pressure to a closed clamping position is also provided for the trap hereinafter disclosed and claimed.

The general object of the invention is to provide an improved animal trap. Other objects of the invention are: to provide a new and improved animal trap including jaw structure adapted to securely hold an animal therebetween to prevent its escape by such means as chewing off its leg, twisting and pulling and the like; to provide a trap of this type including novel means for holding and releasing the jaws; to provide in an improved animal trap novel and improved tripping pan structure characterized by overlapping elements adapted to simultaneously release both jaws even though but a single element is tripped by the animal; to provide in a trap of this type new and improved spring means for normally urging the jaws into a closed body clamping position; to provide an improved animal trap adapted to quickly and efficiently secure an animal caught therein without damaging its pelt; to provide an improved animal trap characterized by lightweight design, economy of manufacture, ease and efficiency of operation; and in general to provide an improved animal trap which is highly versatile and dependable in operation, unique in the shape and coaction of its parts, and rugged and long wearing in service.

The foregoing and other objects and advantages of the invention will become apparent in the following detailed description and accompanying drawing wherein a preferred embodiment thereof is shown by way of illustration and not by way of limitation.

Generally speaking, according to the principles of my invention, I provide a small animal trap primarily for use in capturing muskrats, mink, weasel, beaver and other fur bearing animals. The trap is equipped with a pair of spring operated cooperating jaws that are pivotally mounted to a lightweight base and which are curved in such a manner as to define a relatively elongated animal body enclosure when they are closed. The trap is sprung by means of a pair of cooperating tripping pans which are actuated by the pressure of the animal thereupon. The tripping pans are pivotally connected at their ends to the base and have notched out portions which releasably engage and hold the jaws in an open set position against the pressure of the springs which operate the jaws. The free end of each tripping pan is equipped with a generally elongated tab portion which engages the other pan to permit both pans to simultaneously release both jaws even though the animal steps upon only one of the pans.

Figure 1:
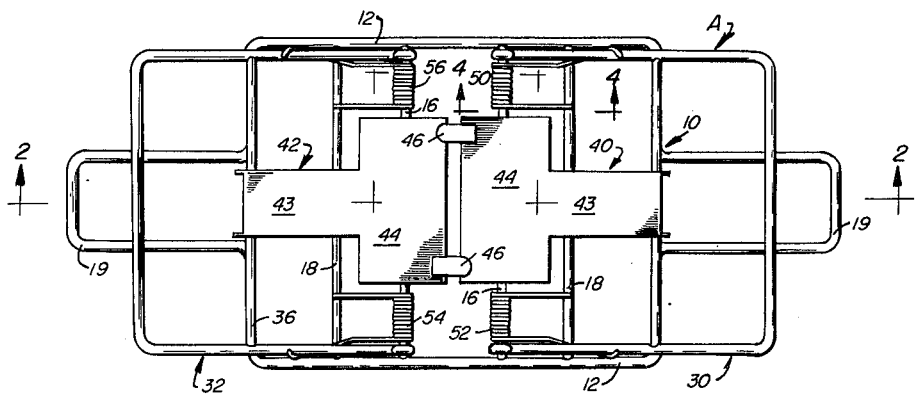
FIGURE 1 is a fragmentary top plan view of the invention.
Figure 2:
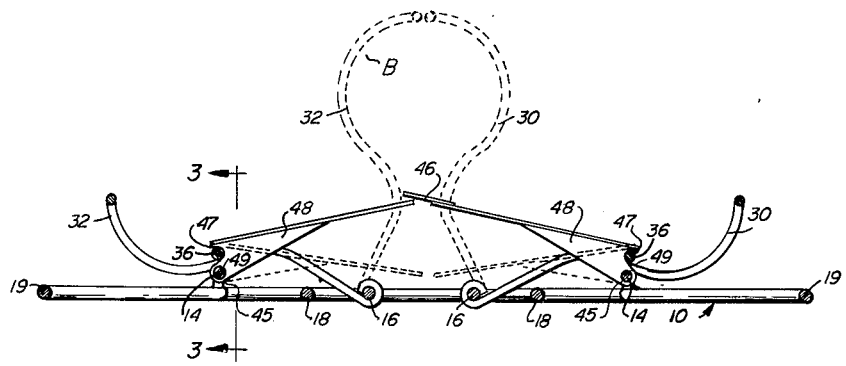
FIGURE 2 is a view, partially in section, taken on the line 2—2 of FIGURE 1, the dotted lines showing the jaws and tripping pans in a released animal clamping position.
Figure 3:
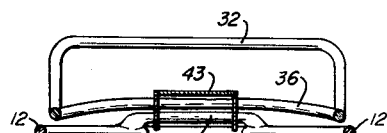
FIGURE 3 is a view, partially in section, taken on the line 3—3 of FIGURE 2.

Referring now to the drawing, the invention, indicated in its entirety by the reference character A, is shown in FIGURES 1 and 2, as including a base member 10 formed of steel wire stock or other suitable material, a pair of cooperating tripping pans 40, 42, and torsion spring members 50, 52, 54, and 56 operable to normally urge jaws 30, 32 into the closed animal clamping position indicated by the dotted lines of FIGURE 2.

Base member 10 consists of a pair of spaced parallel elongated side members 12 that are connected at their ends by laterally extending rigid outer pivot members 14. A pair of laterally extending rigid inner pivot members 16 connect side members 12 on each side of the central lateral axis of base member 10 and a pair of lateral supports 18 connect side members 12 between inner pivot members 16 and outer pivot members 14. Handle structure for base member 10 is provided in the form of a pair of reduced width generally U-shaped members 19 which extend longitudinally outwardly of outer pivot members 14 beyond jaws 30, 32.

Jaws 30, 32 extend laterally of base member 10 and are pivotally mounted at their lower ends upon inner pivot members 16 in a face-to-face relation to each other to form, when in a closed upright animal clamping position, a body enveloping enclosure B which extends laterally of frame 10 in spaced vertical relation thereto. This result is accomplished by virtue of the shape of the jaws; inasmuch as the jaws 30, 32 are identical in configuration to each other, the description will confine itself to the features of one jaw, it being understood that both jaws may be considered mirror images of each other when mounted on base member 10 and cooperate to form the enclosure B. As shown in FIGURES 2 to 5, jaw 30 consists of a pair of laterally spaced outer legs 31 having hooked shaped lower ends 33 that are pivotally secured to inner pivot member 16 adjacent side members 12 of base member 10. Legs 31 each include a straight portion 34 extending from hook end 33 which terminates in a curved portion 35 that is concave towards the lateral axis of base member 10. A lateral tripping pan connector 36 extends between legs 31 in the area of the curved portion 35 of each leg 31. The ends of curved portions 35 are connected by a lateral bar 37. Jaw 30 may thus be considered as comprising a pivotal jaw laterally mounted on base member 10 and having a laterally extending generally semi-cylindrical concavity extending across and above base member 10. Jaw 32 is similarly shaped but it is mounted upon base member 10 in a face-to-face opposed relation to jaw 30 to form therewith the generally cylindrical body engaging enclosure B when the jaws come together. The term "cylindrical" is used here in an illustrative sense only, it being understand that what is meant is a body clamping enclosure adapted to engage and hold the body section of animals of various types.

Tripping pans 40, 42 cooperate with each other and with jaws 30, 32 to hold the jaws in an open set position against spring pressure and to release the jaws for movement into the closed animal body clamping position just described. Each pan 40, 42 is characterized by a flat body 43 having a T-shaped bait-holder 44 at its inner end. The outer end of each body 43 is equipped with depending tapered side skirts 48 which extend therebelow and terminate in a pair of extensions 45 which are apertured as at 49, to pivotally mount pans 40, 42 on outerpivot members 14. Skirts 48 are equipped with notches 47 above apertures 49 which extend slightly inwardly from pivot members 14. Notches 47 releasably engage the tripping pan connectors 36 of jaws 30, 32, as will be explained. Body 43 of each pan 40, 42 extends inwardly from outer pivot members 14 beyond inner pivot members 16 and lateral supports 18 and terminates on each side of the central lateral axis of base member 10. Both pans 40 and 42 rotate about outer pivot members 14 and are operatively connected to each other by means of a generally elongated tab portion 46 which extends inwardly from the top of each bait holder 44. The tab portion 46 secured to pan 40 extends beyond the plane of and engages pan 42; similarly the tab portion 46 secured to pan 42 extends beyond the plane of and engages pan 40.

Figure 4:
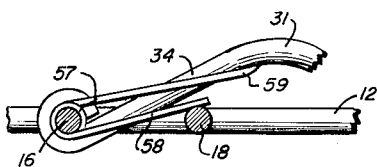
FIGURE 4 is an enlarged fragmentary view, partially in section, taken on the line 4—4 of FIGURE 1.
Figure 5:
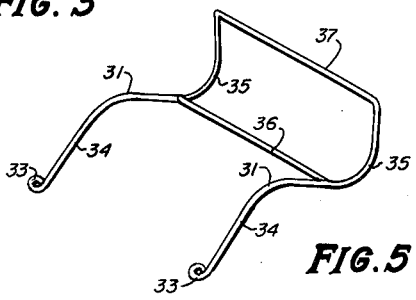
FIGURE 5 is a perspective view on a reduced scale showing one of the jaws forming part of the invention.

Jaws 30, 32 are actuated by a series of torsion spring members 50, 52, 54 and 56 are mounted on inner pivot members 16. As shown in FIGURE 4, each of the torsion spring members is provided with a coil portion 57 which surroundingly engages the pivot member 16, a free end 58 engageable with lateral support 18 and a free end 59 which hooks around the straight portion 34 of leg 31 of the jaws. This arrangement results in the normal biasing of jaws 30, 32 into a closed animal body clamping position.

In setting the trap, the jaws 30, 32 are rotated against the pressure of their springs 50, 52, 54, 56, into an open position overlying base member 10. Tripping pans 40, 42 are pivotally adjusted upwardly so that notches 47 engage connectors 36 of jaws 30, 32. The pans 40, 42, which are canted slightly upwardly, hold the jaws in an open set position until downward pressure on one or the other causes a forward and downward toggling of notches 47 resulting in the quick upward release of the jaws. When setting the trap, either one of the tabs 46 on pans 40, 42 may overlie the opposite pan and extra time is not needed to position the tabs in a special manner. Pressure on one of the pans will cause the simultaneous downward pivotal movement of both pans thereby efficiently releasing both jaws at the same time. The spring 50, 52, 54, 56 can be made strong enough to exert considerable pressure on the jaws to provide quick and efficient closing; the effort needed to set the trap is reduced because the leverage of the jaws can be employed against the spring pressure with members 19 providing a convenient handhold for the setting operation.

My invention has been thoroughly tested and found to be entirely satisfactory for the uses intended. It is believed that the invention, its mode of construction and assembly and operation, as well as its advantages should be readily understood from the foregoing without further description, and it should also be manifest that while a preferred embodiment of the invtntion has been shown and described for illustrative purposes, the structural details nevertheless are capable of wide variation within the purview of the invention as defined in the appended claim.

I claim:
In a body clamping animal trap,
a base,
a pair of spaced parallel inner pivot members carried by said base,
a pair of spaced parallel outer pivot members carried by said base,
said inner and outer pivot members being generally parallel to each other,
a pair of cooperating body clamping jaws pivotally mounted on said inner pivot members,
    said jaws each including a pair of spaced legs pivotally connected at their lower ends to one of said inner pivot members and a pair of connectors extending therebetween,
        said pairs of legs each being curved intermediate their length to form a generally cylindrical body enveloping enclosure when said jaws are closed,
handle structure secured at its inner ends to said outer pivot members, said handle structure including a generally U-shaped member extending outwardly of said outer pivot members beyond said jaws,
a pair of cooperating tripping pans hingedly mounted upon said outer pivot members and extending inwardly beyond said inner pivot members,
    said tripping pans each having notched outer portions engageable with a connector in each jaw to releasably hold the same in an open set position,
    said tripping pans each including an inner bait holder and an elongated tab portion extending inwardly therebeyond in overlying relation to the adjoining tripping pan whereby pressure on one of said tripping pans will simultaneously release the engagement of both tripping pans with said jaws, and
spring means operable to normally urge said jaws into a closed position.

References Cited by the Examiner

UNITED STATES PATENTS

| | | | |
|---|---|---|---|
| 275,995 | 4/83 | Chadwell | 43—90 |
| 1,617,987 | 2/27 | Bond | 43—93 |
| 1,634,270 | 7/27 | Samouce | 43—90 |
| 2,042,728 | 6/36 | Neville | 43—90 |
| 2,559,348 | 7/51 | De Hart | 43—90 |
| 2,587,500 | 2/52 | Maxwell et al. | 43—93 |

ABRAHAM G. STONE, *Examiner.*

SAMUEL KOREN, *Primary Examiner.*